United States Patent
Jalan et al.

(10) Patent No.: US 9,986,061 B2
(45) Date of Patent: May 29, 2018

(54) PROGRAMMING A DATA NETWORK DEVICE USING USER DEFINED SCRIPTS

(71) Applicant: A10 Networks, Inc., San Jose, CA (US)

(72) Inventors: Rajkumar Jalan, Saratoga, CA (US); Rishi Sampat, Santa Clara, CA (US)

(73) Assignee: A10 NETWORKS, INC., San Jose, CA (US)

( * ) Notice: Subject to any disclaimer, the term of this patent is extended or adjusted under 35 U.S.C. 154(b) by 513 days.

(21) Appl. No.: 14/295,265

(22) Filed: Jun. 3, 2014

(65) Prior Publication Data

US 2015/0350379 A1    Dec. 3, 2015

(51) Int. Cl.
| | | |
|---|---|---|
| *G06F 15/16* | (2006.01) | |
| *H04L 12/26* | (2006.01) | |
| *H04L 29/08* | (2006.01) | |

(52) U.S. Cl.
CPC .......... *H04L 67/322* (2013.01); *H04L 67/141* (2013.01)

(58) Field of Classification Search
CPC .......... H04L 47/10; H04L 63/20; H04L 45/56
USPC ........................................................ 709/203
See application file for complete search history.

(56) References Cited

U.S. PATENT DOCUMENTS

| | | | |
|---|---|---|---|
| 5,218,602 A | 6/1993 | Grant et al. | |
| 5,774,660 A | 6/1998 | Brendel et al. | |
| 5,862,339 A | 1/1999 | Bonnaure et al. | |
| 5,875,185 A | 2/1999 | Wang et al. | |
| 5,935,207 A | 8/1999 | Logue et al. | |
| 5,958,053 A | 9/1999 | Denker | |
| 5,995,981 A | 11/1999 | Wikstrom | |
| 6,003,069 A | 12/1999 | Cavill | |
| 6,047,268 A | 4/2000 | Bartoli et al. | |
| 6,075,783 A | 6/2000 | Voit | |
| 6,131,163 A | 10/2000 | Wiegel | |
| 6,219,706 B1 | 4/2001 | Fan et al. | |

(Continued)

FOREIGN PATENT DOCUMENTS

| | | |
|---|---|---|
| CN | 1372662 A | 10/2002 |
| CN | 1449618 | 10/2003 |

(Continued)

OTHER PUBLICATIONS

Cardellini et al., "Dynamic Load Balancing on Web-server Systems", IEEE Internet Computing, vol. 3, No. 3, pp. 28-39, May-Jun. 1999.

(Continued)

*Primary Examiner* — Kevin Bates
*Assistant Examiner* — Emad Siddiqi
(74) *Attorney, Agent, or Firm* — AMPACC Law Group, LLP

(57) ABSTRACT

Exemplary embodiments for programming a network device using user-defined scripts are disclosed. The systems and methods provide for a servicing node to receive a request for a network session between a client device and a server, receive a user defined class and a user defined object configuration from a node controller, and use the information to instruct an object virtual machine to generate at least one user defined object. The servicing node can then apply the at least one user defined object to a data packet of the network session, where the user defined object allows a user to configure the network device with user-defined instruction scripts.

20 Claims, 8 Drawing Sheets

(56) References Cited

U.S. PATENT DOCUMENTS

| | | |
|---|---|---|
| 6,259,705 B1 | 7/2001 | Takahashi et al. |
| 6,321,338 B1 | 11/2001 | Porras et al. |
| 6,374,300 B2 | 4/2002 | Masters |
| 6,456,617 B1 | 9/2002 | Oda et al. |
| 6,459,682 B1 | 10/2002 | Ellesson et al. |
| 6,483,600 B1 | 11/2002 | Schuster et al. |
| 6,535,516 B1 | 3/2003 | Leu et al. |
| 6,578,066 B1 | 6/2003 | Logan et al. |
| 6,587,866 B1 | 7/2003 | Modi et al. |
| 6,600,738 B1 | 7/2003 | Alperovich et al. |
| 6,658,114 B1 | 12/2003 | Farn et al. |
| 6,748,414 B1 | 6/2004 | Bournas |
| 6,772,205 B1 * | 8/2004 | Lavian ............... H04L 41/0213 370/254 |
| 6,772,334 B1 | 8/2004 | Glawitsch |
| 6,779,017 B1 | 8/2004 | Lamberton et al. |
| 6,779,033 B1 | 8/2004 | Watson et al. |
| 6,804,224 B1 | 10/2004 | Schuster et al. |
| 6,952,728 B1 | 10/2005 | Alles et al. |
| 7,010,605 B1 | 3/2006 | Dharmarajan |
| 7,013,482 B1 | 3/2006 | Krumel |
| 7,058,718 B2 | 6/2006 | Fontes et al. |
| 7,069,438 B2 | 6/2006 | Balabine et al. |
| 7,076,555 B1 | 7/2006 | Orman et al. |
| 7,143,087 B2 | 11/2006 | Fairweather |
| 7,167,927 B2 | 1/2007 | Philbrick et al. |
| 7,181,524 B1 | 2/2007 | Lele |
| 7,218,722 B1 | 5/2007 | Turner et al. |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,373,500 B2 | 5/2008 | Ramelson et al. |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,610,622 B2 | 10/2009 | Touitou et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,733,866 B2 | 6/2010 | Mishra et al. |
| 7,747,748 B2 | 6/2010 | Allen |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,965,727 B2 | 6/2011 | Sakata et al. |
| 7,970,934 B1 | 6/2011 | Patel |
| 7,979,694 B2 | 7/2011 | Touitou et al. |
| 7,983,258 B1 | 7/2011 | Ruben et al. |
| 7,990,847 B1 | 8/2011 | Leroy et al. |
| 7,991,859 B1 | 8/2011 | Miller et al. |
| 7,992,201 B2 | 8/2011 | Aldridge et al. |
| 8,019,870 B1 | 9/2011 | Eppstein et al. |
| 8,032,634 B1 | 10/2011 | Eppstein et al. |
| 8,081,640 B2 | 12/2011 | Ozawa et al. |
| 8,090,866 B1 | 1/2012 | Bashyam et al. |
| 8,099,492 B2 | 1/2012 | Dahlin et al. |
| 8,116,312 B2 | 2/2012 | Riddoch et al. |
| 8,122,116 B2 | 2/2012 | Matsunaga et al. |
| 8,151,019 B1 | 4/2012 | Le et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,261,339 B2 | 9/2012 | Aldridge et al. |
| 8,266,235 B2 | 9/2012 | Jalan et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,554,929 B1 | 10/2013 | Szeto et al. |
| 8,559,437 B2 | 10/2013 | Mishra et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,137,301 B1 | 9/2015 | Dunlap et al. |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,386,088 B2 | 7/2016 | Zheng et al. |
| 9,531,846 B2 | 12/2016 | Han et al. |
| 9,602,442 B2 | 3/2017 | Han |
| 2001/0042200 A1 | 11/2001 | Lamberton et al. |
| 2001/0049741 A1 | 12/2001 | Skene et al. |
| 2002/0026515 A1 | 2/2002 | Michielsens et al. |
| 2002/0032777 A1 | 3/2002 | Kawata et al. |
| 2002/0032799 A1 | 3/2002 | Wiedeman et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0141386 A1 | 10/2002 | Minert et al. |
| 2002/0143991 A1 | 10/2002 | Chow et al. |
| 2002/0178259 A1 | 11/2002 | Doyle et al. |
| 2002/0188678 A1 | 12/2002 | Edecker et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |

(56) References Cited

U.S. PATENT DOCUMENTS

| | | |
|---|---|---|
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0061506 A1 | 3/2003 | Cooper et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0010545 A1 | 1/2004 | Pandya |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0103315 A1 | 5/2004 | Cooper et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0250059 A1 | 12/2004 | Ramelson et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0039033 A1 | 2/2005 | Meyers et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2005/0281190 A1 | 12/2005 | McGee et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0041745 A1 | 2/2006 | Parnes |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0164978 A1 | 7/2006 | Werner et al. |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0022479 A1 | 1/2007 | Sikdar et al. |
| 2007/0076653 A1 | 4/2007 | Park et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0124502 A1* | 5/2007 | Li ................... H04L 41/0226 709/246 |
| 2007/0156919 A1 | 7/2007 | Potti et al. |
| 2007/0165622 A1 | 7/2007 | O'Rourke et al. |
| 2007/0180119 A1 | 8/2007 | Khivesara et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0242738 A1 | 10/2007 | Park et al. |
| 2007/0243879 A1 | 10/2007 | Park et al. |
| 2007/0245090 A1 | 10/2007 | King et al. |
| 2007/0248009 A1 | 10/2007 | Petersen |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0016161 A1 | 1/2008 | Tsirtsis et al. |
| 2008/0031263 A1 | 2/2008 | Ervin et al. |
| 2008/0076432 A1 | 3/2008 | Senarath et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0120129 A1 | 5/2008 | Seubert et al. |
| 2008/0134332 A1 | 6/2008 | Keohane et al. |
| 2008/0162679 A1 | 7/2008 | Maher et al. |
| 2008/0225719 A1* | 9/2008 | Korrapati ............ H04L 41/0233 370/235 |
| 2008/0225722 A1* | 9/2008 | Khemani ................ H04L 63/20 370/235 |
| 2008/0228781 A1 | 9/2008 | Chen et al. |
| 2008/0250099 A1 | 10/2008 | Shen et al. |
| 2008/0253390 A1 | 10/2008 | Das et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2008/0298303 A1 | 12/2008 | Tsirtsis |
| 2009/0024722 A1 | 1/2009 | Sethuraman et al. |
| 2009/0031415 A1 | 1/2009 | Aldridge et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0285196 A1 | 11/2009 | Lee et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0042869 A1 | 2/2010 | Szabo et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0095018 A1* | 4/2010 | Khemani ................ H04L 41/50 709/232 |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0205310 A1 | 8/2010 | Altshuler et al. |
| 2010/0210265 A1 | 8/2010 | Borzsei et al. |

(56) References Cited

U.S. PATENT DOCUMENTS

| | | |
|---|---|---|
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0083174 A1 | 4/2011 | Aldridge et al. |
| 2011/0093522 A1 | 4/2011 | Chen et al. |
| 2011/0099403 A1 | 4/2011 | Miyata et al. |
| 2011/0099623 A1 | 4/2011 | Garrard et al. |
| 2011/0110294 A1 | 5/2011 | Valluri et al. |
| 2011/0145324 A1 | 6/2011 | Reinart et al. |
| 2011/0149879 A1 | 6/2011 | Noriega et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshchandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0117382 A1 | 5/2012 | Larson et al. |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0179770 A1 | 7/2012 | Jalan et al. |
| 2012/0191839 A1 | 7/2012 | Maynard |
| 2012/0215910 A1 | 8/2012 | Wada |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2012/0311116 A1 | 12/2012 | Jalan et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1 | 5/2013 | Feinberg et al. |
| 2013/0135996 A1 | 5/2013 | Torres et al. |
| 2013/0136139 A1 | 5/2013 | Zheng et al. |
| 2013/0148500 A1 | 6/2013 | Sonoda et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0258846 A1 | 10/2013 | Damola |
| 2013/0282791 A1 | 10/2013 | Kruglick |
| 2014/0012972 A1 | 1/2014 | Han |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0026794 A1* | 1/2015 | Zuk ................ H04L 63/0227 726/13 |
| 2015/0039671 A1 | 2/2015 | Jalan et al. |
| 2015/0085871 A1* | 3/2015 | Harper ............... H04L 69/18 370/419 |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0244566 A1 | 8/2015 | Puimedon |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312092 A1 | 10/2015 | Golshan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2016/0014052 A1 | 1/2016 | Han |
| 2016/0014126 A1 | 1/2016 | Jalan et al. |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0156708 A1 | 6/2016 | Jalan et al. |
| 2016/0173579 A1 | 6/2016 | Jalan et al. |
| 2017/0048107 A1 | 2/2017 | Dosovitsky et al. |
| 2017/0048356 A1 | 2/2017 | Thompson et al. |

FOREIGN PATENT DOCUMENTS

| | | |
|---|---|---|
| CN | 1473300 A | 2/2004 |
| CN | 1529460 | 9/2004 |
| CN | 1575582 | 2/2005 |
| CN | 1714545 A | 12/2005 |
| CN | 1725702 | 1/2006 |
| CN | 1910869 A | 2/2007 |
| CN | 101004740 A | 7/2007 |
| CN | 101094225 | 12/2007 |
| CN | 101163336 A | 4/2008 |
| CN | 101169785 A | 4/2008 |
| CN | 101189598 | 5/2008 |
| CN | 101193089 A | 6/2008 |
| CN | 101247349 A | 8/2008 |
| CN | 101261644 A | 9/2008 |
| CN | 101442425 A | 5/2009 |
| CN | 101495993 A | 7/2009 |
| CN | 101682532 A | 3/2010 |
| CN | 101878663 A | 11/2010 |
| CN | 102123156 A | 7/2011 |
| CN | 102143075 A | 8/2011 |
| CN | 102546590 | 7/2012 |
| CN | 102571742 | 7/2012 |
| CN | 102577252 | 7/2012 |
| CN | 102918801 | 2/2013 |
| CN | 103533018 A | 1/2014 |

(56) References Cited

FOREIGN PATENT DOCUMENTS

| | | |
|---|---|---|
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 A | 7/2015 |
| CN | 102577252 B | 3/2016 |
| CN | 102918801 B | 5/2016 |
| EP | 1209876 | 5/2002 |
| EP | 1770915 | 4/2007 |
| EP | 1885096 | 2/2008 |
| EP | 02296313 | 3/2011 |
| EP | 2577910 | 4/2013 |
| EP | 2622795 | 8/2013 |
| EP | 2647174 | 10/2013 |
| EP | 2760170 | 7/2014 |
| EP | 2772026 | 9/2014 |
| EP | 2901308 A2 | 8/2015 |
| EP | 2760170 B1 | 12/2015 |
| HK | 1182560 | 11/2013 |
| HK | 1183569 A | 12/2013 |
| HK | 1183996 A | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A | 8/2015 |
| IN | 261CHE2014 A | 7/2011 |
| IN | Journal39/2015 | 9/2015 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |
| JP | 2013528330 | 5/2011 |
| JP | 2014504484 A | 2/2014 |
| JP | 2014143686 | 8/2014 |
| JP | 2015507380 A | 3/2015 |
| JP | 5855663 B2 | 12/2015 |
| JP | 5906263 B | 3/2016 |
| JP | 5913609 B2 | 4/2016 |
| KR | 10-0830413 | 5/2008 |
| KR | 20130096624 A | 8/2013 |
| KR | 101576585 B1 | 12/2015 |
| TW | 269763 B | 2/1996 |
| TW | 425821 B | 3/2001 |
| TW | 444478 B | 7/2001 |
| WO | 01/13228 | 2/2001 |
| WO | 2001014990 | 3/2001 |
| WO | WO2001045349 | 6/2001 |
| WO | 2003103237 | 12/2003 |
| WO | WO2004084085 A1 | 9/2004 |
| WO | WO2006098033 A1 | 9/2006 |
| WO | 2008053954 | 5/2008 |
| WO | WO2008078593 A1 | 7/2008 |
| WO | 2011049770 | 4/2011 |
| WO | WO2011079381 A1 | 7/2011 |
| WO | 2011149796 | 12/2011 |
| WO | 2012050747 | 4/2012 |
| WO | 2012075237 | 6/2012 |
| WO | WO2012083264 A2 | 6/2012 |
| WO | WO2012097015 A2 | 7/2012 |
| WO | 2013070391 | 5/2013 |
| WO | 2013081952 | 6/2013 |
| WO | 2013096019 | 6/2013 |
| WO | 2013112492 | 8/2013 |
| WO | WO2014031046 A1 | 2/2014 |
| WO | 2014052099 | 4/2014 |
| WO | 2014088741 | 6/2014 |
| WO | 2014093829 | 6/2014 |
| WO | WO2014138483 | 9/2014 |
| WO | WO2014144837 | 9/2014 |
| WO | WO2014179753 | 11/2014 |
| WO | WO2015153020 A1 | 10/2015 |
| WO | WO2015164026 A1 | 10/2015 |

OTHER PUBLICATIONS

Hunt et al. NetDispatcher: A TCP Connection Router, IBM Research Report RC 20853 May 19, 1997.
Spatscheck et al., "Optimizing TCP Forwarder Performance", IEEE/ACM Transactions on Networking, vol. 8, No. 2, Apr. 2000.
Kjaer et al. "Resource allocation and disturbance rejection in web servers using SLAs and virtualized servers", IEEE Transactions on Network and Service Management, IEEE, US, vol. 6, No. 4, Dec. 1, 2009.
Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.
Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.
"Tcp—TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=asci>>, Nov. 25, 2007, 11 pages.
Koike et al., "Transport Middleware for Network-Based Control," IEICE Technical Report, Jun. 22, 2000, vol. 100, No. 53, pp. 13-18.
Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.
Abe et al., "Adaptive Split Connection Schemes in Advanced Relay Nodes," IEICE Technical Report, Feb. 22, 2010, vol. 109, No. 438, pp. 25-30.
"Enhanced Interior Gateway Routing Protocol", Cisco, Document ID 16406, Sep. 9, 2005 update, 43 pages.
Crotti, Manuel et al., "Detecting HTTP Tunnels with Statistical Mechanisms", IEEE International Conference on Communications, Jun. 24-28, 2007, pp. 6162-6168.
Haruyama, Takahiro et al., "Dial-to-Connect VPN System for Remote DLNA Communication", IEEE Consumer Communications and Networking Conference, CCNC 2008. 5th IEEE, Jan. 10-12, 2008, pp. 1224-1225.
Chen, Jianhua et al., "SSL/TLS-based Secure Tunnel Gateway System Design and Implementation", IEEE International Workshop on Anti-counterfeiting, Security, Identification, Apr. 16-18, 2007, pp. 258-261.
"EIGRP MPLS VPN PE-CE Site of Origin (SoO)", Cisco Systems, Feb. 28, 2006, 14 pages.

* cited by examiner

PROGRAMMING A DATA NETWORK DEVICE USING USER DEFINED SCRIPTS

BACKGROUND OF THE INVENTION

Field of the Invention

The present invention relates generally to data networks, and more particularly, to a data network device that is programmed using user defined scripts.

Description of the Related Art

In a typical network deployment scenario, a company, such as a service provider or a corporation, constructs a data network by purchasing or leasing one or more network devices, connecting the devices with each other and to servers and gateways, and configuring the devices to reflect the network design. The data network is controlled and operated by the company. The company may use the data network to serve its clients or internal business divisions. For example, a web hosting service provider hosts websites for its clients and allows the clients' data traffic to be processed by the data network. Often times, the company also provides servers such as web servers or video servers to serve the clients.

Though it is common for a service provider to allow the clients to download and to run client software on the provided servers, it is not possible for the clients to download client software or instructions onto the network devices within the data network. This limitation presents issues to the service provider as well as the clients. As there are many clients and each client has different needs, it is impossible for the service provider to offer a one-size-fits-all or a gold-silver-bronze type of network service policy to accommodate many client needs in the data network. Clients, on the other hand, want to operate their own software, policies, and configuration and control of network resources that they lease from the service provider. All in all, both parties have a common desire to open up the data network so that a client can download client software directly to the network devices and so that the service provider can offer a better business experience to satisfy clients' needs.

It should be apparent from the foregoing that there is a need to provide a method to program a network device with user defined instruction scripts.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for a user to program a network device with user-defined instruction scripts. An exemplary method for configuring a network device comprises receiving a request for a network session between a client device and a server; receiving a user defined class and a user defined object configuration at a servicing node, the user defined class and user defined object configuration used by the servicing node to instruct an object virtual machine to generate at least one user defined object; and applying the at least one user defined object to a data packet of the network session, wherein the user defined object allows a user to configure the network device with user-defined instruction scripts.

A system for programming a network device with user-defined scripts is also disclosed. The system may comprise a servicing node comprising at least one user defined object and an object virtual machine that executes instructions enabled by the at least one user defined object while the servicing node processes a network session between a client device and a server. The system may also comprise at least one node controller that sends a user defined class and a user defined object configuration to the servicing node, the user defined class and user defined object configuration used by the servicing node to instruct an object virtual machine to generate the at least one user defined object.

In further example embodiments of the present disclosure, the method steps are stored on a machine-readable medium comprising instructions, which when implemented by one or more processors, perform the recited steps. In further example embodiments, hardware systems, or devices, can be adapted to perform the recited steps. Other features, examples, and embodiments are described below.

BRIEF DESCRIPTION OF THE DRAWINGS

Embodiments are illustrated by way of example and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

Figure 1:
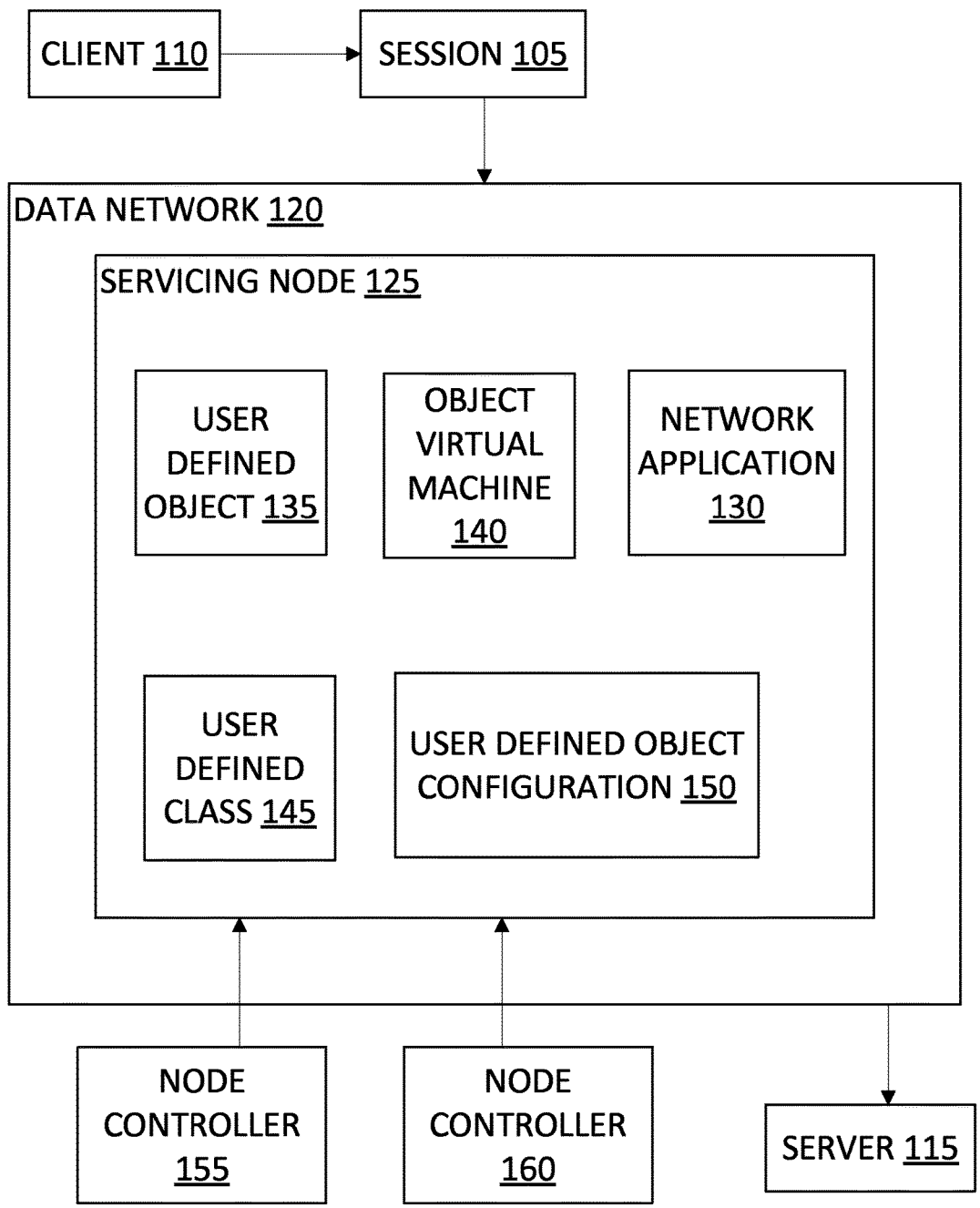
FIG. 1 illustrates an exemplary embodiment of a servicing node servicing a session based on user defined objects.

FIG. 1 illustrates an exemplary embodiment of a servicing node processing a service session 105 (also referred to herein as session 105) between a client 110 and a server 115. In one embodiment, client 110 conducts a session 105 with server 115 over data network 120. Data packets of session 105 are sent through data network 120 to servicing node 125. Servicing node 125 may modify session 105 data packets and forward the data packets to server 115.

In some embodiments, client 110 is a computing device connected to data network 120 using a network module of the client. The client device can be a personal computer, a laptop computer, a tablet, a smartphone, a mobile phone, an Internet phone, a netbook, a home gateway, a broadband gateway, a network appliance, a set-top box, a media server, a personal media player, a personal digital assistant, an access gateway, a networking switch, a server computer, a network storage computer, or any computing device comprising a network module and a processor module.

In various embodiments, server 115 is a server computer connected to data network 120 using a network module of the server computer. Server 115 serves service session 105 requested by client 110. Service session 105 may be an application service session and include, but is not limited to, a HTTP session, a file transfer session, a FTP session, a voice over IP session, a SIP session, a video or audio streaming session, an e-commerce session, an enterprise application session, an email session, an online gaming session, a teleconference session, or a Web-based communication session. Data network 120 includes an Ethernet network, an ATM network, a cellular network, a wireless network, a Frame Relay network, an optical network, an IP network, or any data communication network utilizing other physical layer, link layer capability or network layer to carry data packets.

In some embodiments, servicing node 125 includes a network application 130 and applies network application 130 to session 105 data packets. Network application 130 includes, but is not limited to, a network proxy application such as TCP proxy, HTTP proxy, SIP proxy, a content delivery network application, a server load balancing application, a firewall, a remote access application, an application delivery application, a network traffic management and control application, a legal interception, a network optimization, an email scanning application, or an access control application.

Figure 2:
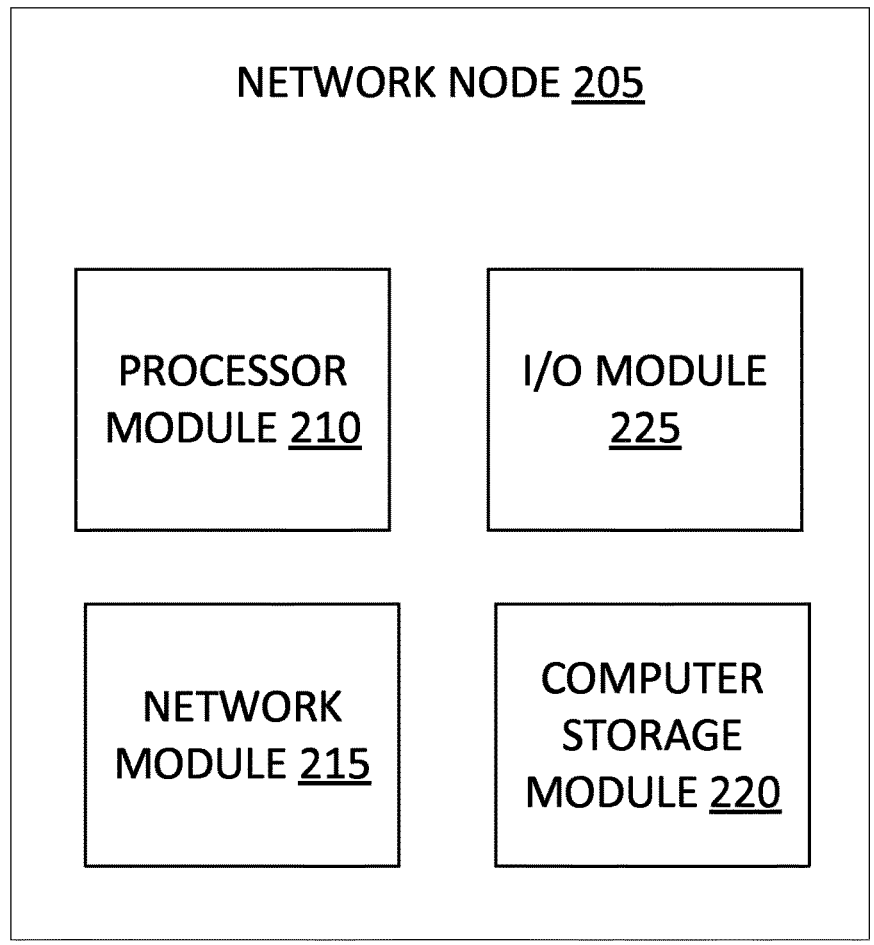
FIG. 2 illustrates an exemplary embodiment of a network node.

FIG. 2 illustrates an exemplary embodiment of a network node 205 which can be a servicing node or a node controller. Network node 205 includes, but is not limited to, a processor module 210, a network module 215, and a computer storage module 220. Processor module 210 includes one or more processors which may be a micro-processor, an Intel processor, an AMD processor, a MIPS processor, an ARM-based processor, or a RISC processor. In some embodiments, processor module 210 includes one or more processor cores embedded in a processor. Additionally, processor module 210 may include one or more embedded processors, or embedded processing elements in a Field Programmable Gate Array (FPGA), an Application Specific Integrated Circuit (ASIC), or Digital Signal Processor (DSP). In various embodiments, network module 215 includes a network interface such as Ethernet, optical network interface, a wireless network interface, T1/T3 interface, or a WAN or LAN interface. Furthermore, network module 215 includes a network processor. Computer storage module 220 includes RAM, DRAM, SRAM, SDRAM, or memory utilized by processor module 210 or network module 215. Computer storage module 220 stores data utilized by processor module 210 and comprises a hard disk drive, a solid state drive, an external disk, a DVD, a CD, or a readable external disk. Additionally, computer storage module 220 stores one or more computer programming instructions, which when executed by processor module 210 or network module 215, implement one or more of the functionalities of the present invention. Network node 205 also may include an input/output (I/O) module 225, which comprises a keyboard, a keypad, a mouse, a gesture-based input sensor, a microphone, a physical or sensory input peripheral, a display, a speaker, or a physical or sensual output peripheral.

Referring again to FIG. 1, in various embodiments, servicing node 125 includes a user defined object 135 and an object virtual machine 140. User defined object 135 includes one or more parameters to enable one or more instructions to be executed by object virtual machine 140. Servicing node 125 may invoke object virtual machine 140 to execute the instructions enabled by user defined object 135 while servicing node 125 processes session 105. In other embodiments, servicing node 125 may apply user defined object 135 in conjunction with network application 130 to process session 105.

In some embodiments, servicing node 125 creates user defined object 135 from a user defined class 145 and a user defined object configuration 150. User defined class 145 includes an instruction script or one or more instructions, a template for one or more instructions, or a description that can be used to create user defined object 135. User defined object configuration 150 includes one or more configurations, one or more commands, one or more pieces of data, or one or more attributes for creating user defined object 135. Node controller 155 programs servicing node 125 with user defined class 145 script or by sending user defined class 145 to servicing node 125. Alternatively, node controller 155 or another node controller 160 sends to servicing node 125 user defined object configuration 150. While two node controllers are depicted in exemplary FIG. 1, any number of node controllers may be connected to a servicing node.

In various embodiments, servicing node 125 may create and apply user defined object 135 after receiving user defined object configuration 150 and user defined class 145, prior to processing session 105, or when processing session 105 is in progress.

Figure 3:
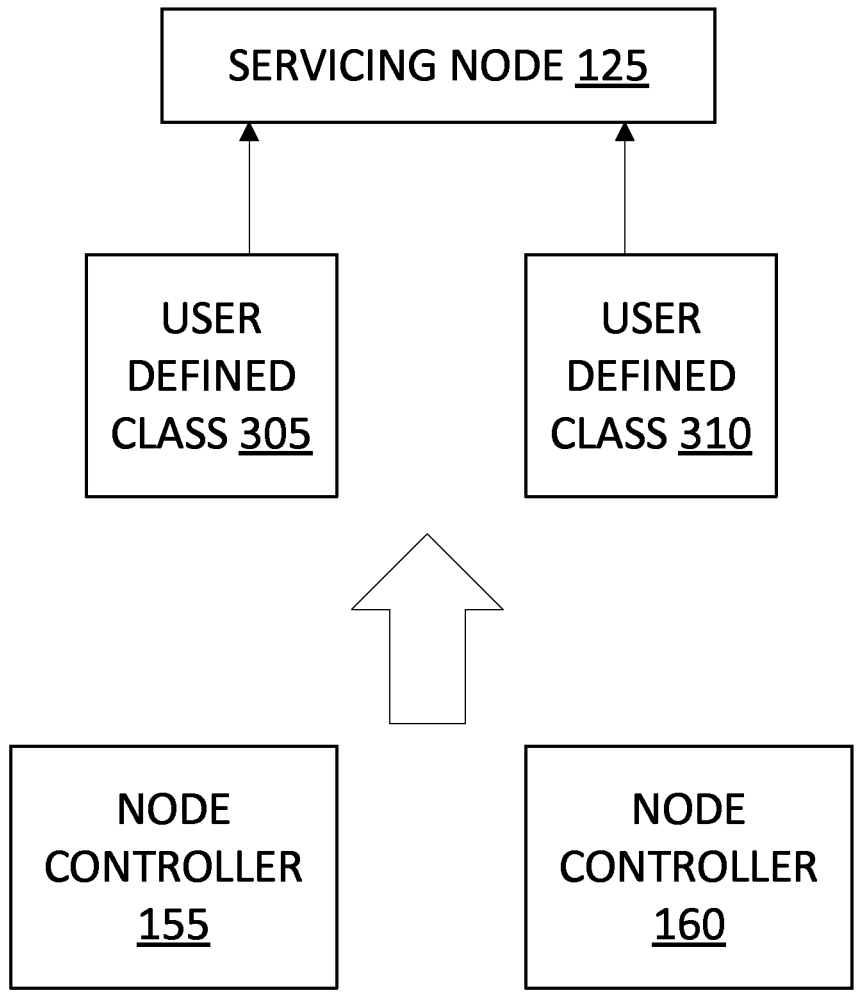
FIG. 3 illustrates an exemplary embodiment of programming a servicing node with user defined class.

FIG. 3 illustrates an exemplary embodiment for servicing node 125 to receive a plurality of user defined classes such as user defined class 305 and user defined class 310. Servicing node 125 may receive the plurality of user defined classes from node controller 155 or from a plurality of node controllers such as node controller 155 and node controller 160.

In some embodiments, user defined class 305 and user defined class 310 are not related. In other embodiments, user defined class 305 is related to user defined class 310. Table 1a and Table 1b illustrate exemplary embodiments of user defined class 305 and user defined class 310.

TABLE 1a

```
// User Defined Class 305
name = cm-se-name,            // Name of User Defined Class
occurrences = multiple,       // allow creation of multiple user defined
                                 objects
license = se-isp,             // require license named "se-isp"
config-fields:
config = <start>,
    // created object has a name identity
    se-name = string <mvm; help SE name; range 1-14>,
    // object has an IP address attribute
    ip = ipv4-cidr <mb; dup-ip-check; help SE IP address range; >,
    // Security policy
    ddos-checks = flag <mk; help Enable ddos checks on SE>,
    // Service policy, such as bandwidth (bw), capacity, allowed
network appl
    bw = number <mb; allowed 200-2000; help Mbps;>,
    conn-limit = number<mb; allowed 1-5000; help No. of connections>,
    // selectable list of network applications
    permit-apps = dummy <mk; help Permit application list>,
    http = flag <ok; condition permit-apps; link-next-fwd ftp>,
    ftp = flag <ok; condition permit-apps; link-next-fwd https>,
    https = flag <ok; condition permit-apps; link-next-rev http>,
        // accounting policy
    enable-stats-collection = flag <mk;>,
config=<end>;
```

TABLE 1b

```
// User Defined Class 310
name=cm-se-region
help=Create/delete a region object,
occurrences=multiple,
license=se-isp,
config-fields:
config=<start>,
    se-region=string<mvm; help SE region; range 1-6>,
        // User Defined Class 310 uses User Defined Class 305
        "se-name" se-name=string <mb; help SE name;
    range 1-14; max-elements 8;obj-association bw = number
        <mb; allowed 1000-500; help Mbps;>, cm-se-name>,
config=<end>;
```

In Table 1a, user defined class 305 is named "cm-se-name". The attribute occurrences being "multiple" allows servicing node 125 to create multiple user defined objects based on user defined class 305. The attribute license "se-isp" indicates user defined class 305 requires a license "se-isp" in order to create an associated user defined object. The attribute config-fields includes a list of configurable attributes which are to be included in a user defined object configuration. The config attribute se-name assigns a name to a created user defined object. The config attribute ip assigns an IP address or IP address range to a created user defined object. Typically, different created user defined objects of user defined class 305 are configured with different IP addresses. The ip attribute allows object virtual machine 140 to determine if a user defined object is applicable to a session data packet. The config attributes may include other attributes such as layer 2 information, TCP/UDP port number, a pattern, a cookie, a layer 7 identifier, or any attribute that can be used to identify a data packet or a session.

The config attributes may include one or more attributes related to a security policy such as ddos-checks (applying Denial of Service (DOS) and Distributed Denial of Services (DDOS) detection). The config attributes include one or more attributes related to service policy such as bw (bandwidth capacity), conn-limit (capacity of active connections), and others. The config attributes may include permission to use one or more network applications available within servicing node 125, such as http, ftp, and https. The config attributes may further include one or more attributes related to data collection or accounting record processing or policy, such as enable-stats-collection (enabling the collection of various statistics).

Table 1b illustrates an embodiment of user defined class 310. In this exemplary embodiment, user defined class 310 refers to user defined class 305. The name attribute gives user defined class 310 a name of "cm-se-region". The help attribute indicates a network administrator may get help in order to generate a user defined object configuration using cm-se-region. The occurrences attribute "multiple" indicates multiple user defined objects using cm-se-region can be created. In other embodiments, having occurrences attribute "single" is to indicate at most one user defined object can be created based on the user defined class. The license attribute indicates a license named "se-isp" is required. In the exemplary embodiment of Table 1b, cm-se-region uses the same license as cm-se-name. In other embodiments, cm-se-region has a different license attribute than cm-se-name.

The config attributes of cm-se-region include se-region attribute assigning a name to a user defined object using cm-se-region. The configurable se-name attribute includes a list of user defined objects with names based on se-name. Recall Table 1a where se-name is a configurable name for a user defined object of cm-se-name. The configurable se-name attribute of cm-se-region, therefore, includes a list of user defined objects of cm-se-name.

Figure 4:
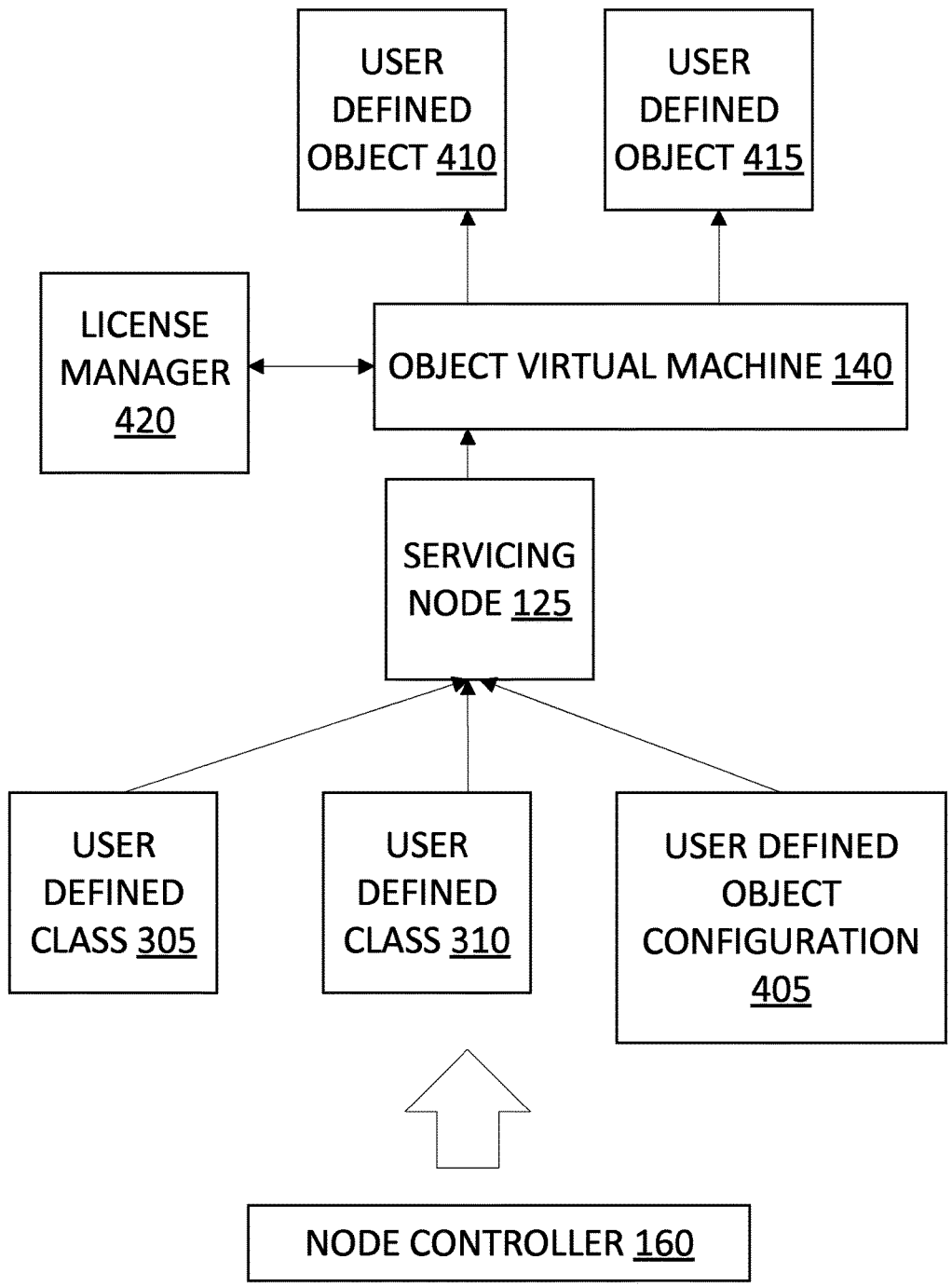
FIG. 4 illustrates an exemplary embodiment of configuring user defined objects.

Referring to FIG. 4, servicing node 125 receives user defined object configuration 405 from node controller 160. Table 2 illustrates an exemplary embodiment of user defined object configuration 405 based on Table 1a and Table 1b.

TABLE 2

```
// User Defined Object Configuration 405
    cm-se-name se-name=Seattle ip=1.1.1.0/24 bw=200Mbps
conn-limit=500 permit-apps http ftp enable-stats-collection
    cm-se-name se-name="Bay Area" ip=1.1.3.0/23 bw=500Mbps
ddos-check conn-limit=2000 permit-apps http ftp https enable-stats-
collection
    cm-se-name se-name="Los Angeles" ip=1.1.5.0/23 bw=1000Mbps
conn-limit=2500 permit-apps http ftp https enable-stats-collection
    cm-se-region se-region="West Coast" se-name=Seattle se-name=
"Bay Area" se-name="Los Angles" bw=2500Mbps
```

In Table 2, three cm-se-name objects are configured. The first one is named Seattle with an IP address 1.1.1.0/24, a bandwidth capacity of 200 Mbps, a connection capacity of 500, a list of permitted network applications "http, ftp", and with statistics data collection enabled.

The second cm-se-name object is named "Bay Area" with a configured IP address 1.1.3.0/23, a bandwidth capacity of 500 Mbps, a connection capacity of 2000, a list of permitted network applications "http, ftp, https", and with statistics data collection enabled. Se-name object "Bay Area" also has security policy DDOS enabled.

The third cm-se-name object is named "Los Angeles" with a configured IP address 1.1.5.0/23, a bandwidth capacity of 1000 Mbps, a connection capacity of 2500, a list of permitted network applications "http, ftp, https" and with statistics data collection enabled.

User defined object configuration 405 includes one configured cm-se-region object, named "West Coast" and a bandwidth capacity of 2500 Mbps. The cm-se-region object includes the se-name objects "Bay Area", Seattle, and "Los Angeles". In this embodiment, the bandwidth capacity of 2500 Mbps is applied as the capacity for the combined bandwidth capacities of se-name objects "Bay Area", Seattle and "Los Angeles".

Upon receiving user defined object configuration 405 and user defined classes 305 and 310, servicing node 125 instructs object virtual machine 140 to generate various user defined objects according to user defined object configuration 405, such as user defined objects 410 and 415. In some embodiments, object virtual machine 140 determines that a user defined class requires a license. Object virtual machine 140 communicates with a networked license manager 420, which can be a network computer or a software module in a network server or in a node controller. Once object virtual machine 140 determines that servicing node 125 is licensed to use the user defined class, object virtual machine 140 creates the user defined object, such as cm-se-name object "Bay Area". In one embodiment, object virtual machine 140 verifies the necessary licenses to use user defined classes 305 and 310, object virtual machine 140 creates cm-se-name objects "Bay Area", Seattle and "Los Angeles", and cm-se-region object "West Coast".

Figure 5:
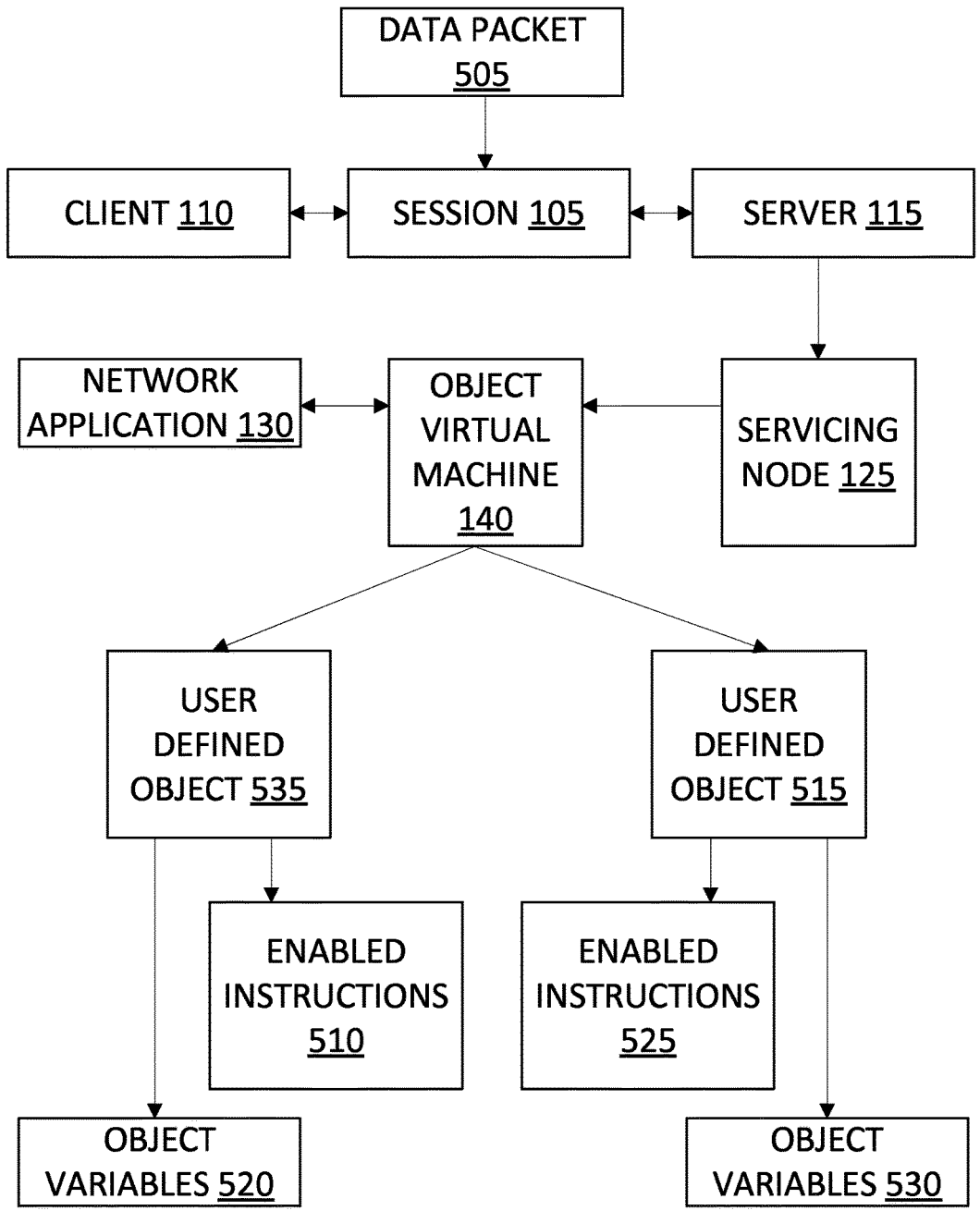
FIG. 5 illustrates an exemplary embodiment of processing a data packet of a session using user defined objects.

FIG. 5 illustrates an exemplary embodiment of processing a data packet 505 of session 105. Data packet 505 may be sent by client 110 to server 115 or from server 115 to client 110. In various embodiments, client 110 sends data packet 505 to server 115, and servicing node 125 receives data packet 505. Then, servicing node 125 sends data packet 505 to object virtual machine 140 for processing, and object virtual machine 140 matches data packet 505 with user defined object 535. Using an embodiment where user defined object 535 is an cm-se-name object named "Bay Area", object virtual machine 140 matches the cm-se-name IP address attribute with an IP address of data packet 505 such as a destination IP address or a source IP address. If object virtual machine 140 determines there is a match, object virtual machine 140 applies cm-se-name object "Bay Area" to data packet 505. In some embodiments, object "Bay Area" enables instructions 510 based on configured attributes of object "Bay Area", which include ddos-check, enable-stats-collection, bandwidth capacity, connection capacity, and a list of permissible network applications. Object virtual machine 140 applies instructions 510 to data packet 505. In various embodiments, object virtual machine 140 checks data packet 505 for DDOS detection and collects data statistics such as packet count, data count, and/or connection count. If a DDOS is detected, object virtual machine 140 may apply security policy handling to data packet 505 or session 105. In other embodiments, object virtual machine 140 checks data packet 505 for bandwidth capacity for object "Bay Area". If bandwidth capacity for object "Bay Area" is not exceeded, data packet 505 is allowed to be processed further. However, if the bandwidth capacity for object "Bay Area" is exceeded, object virtual machine 140 may delay processing data packet 505 until bandwidth capacity is no longer exceeded or object virtual machine 140 may discard data packet 505.

In some embodiments, object virtual machine 140 matches data packet 505 against the list of permissible network applications in object "Bay Area". Object virtual machine 140 retrieves layer 7 information from data packet 505, such as a TCP/UDP port number, content in the data packet 505 payload, or information based on a prior data packet of session 105, to match the list of network applications. If data packet 505 represents a HTTP data packet and HTTP is in the list of permissible network applications, object virtual machine 140 allows continuing processing of data packet 505. If, for example, data packet 505 represents a SIP data packet and SIP is not in the list of permissible network applications, object virtual machine 140 may discard data packet 505 or record an alert event for servicing node 125.

In various embodiments, object virtual machine 140 determines user defined object 515, for example, being cm-se-region object "West Coast", is to be applied. Object virtual machine 140 may determine to apply user defined object 515 based on the association between cm-se-region object "West Coast" and se-name object "Bay Area" or based on a match between data packet 505 and user defined object 515. Object virtual machine 140 applies instructions 525 enabled by the configurable attributes of cm-se-region object "West Coast," which include bandwidth capacity and statistics collection. Object virtual machine 140 processes data packet 505 for bandwidth capacity and statistics collection according to the corresponding object "West Coast" configured values.

In some embodiments, user defined object 535 is associated with one or more object variables 520, such as one or more counters for the statistics collection, bandwidth capacity, number of active connections, and DDOS detection variables. Object virtual machine 140 updates values of object variables 520 upon processing data packet 505. Object virtual machine 140 may update object variables 520 from time to time or based on administrator's command. In a similar embodiment, object virtual machine 140 updates object variables 530 associated to user defined object 515.

Object virtual machine 140 further sends data packet 505 to network application 130 for processing. During processing of data packet 505, network application 130 may invoke object virtual machine 140 for additional processing. Using cm-se-name object "Bay Area" for illustration, network application 130 determines if data packet 505 is a connection request. Network application 130 invokes object virtual machine 140 to process a connection request, and object virtual machine 140 determines that object "Bay Area" is applicable and checks if the connection capacity attribute of object "Bay Area" is exceeded. If the connection capacity attribute of object "Bay Area" is not exceeded, object virtual machine 140 instructs network application 130 to continue processing data packet 505. If the connection capacity attribute of object "Bay Area" is exceeded, object virtual machine 140 may instruct network application 130 to reject the connection request or to delay processing data packet 505 until the connection capacity attribute is no longer exceeded. In some embodiments, object virtual machine 140 updates object variables 520 of object "Bay Area". In another embodiment, object virtual machine 140 determines if user defined object 515 or object "West Coast" is also applicable. Object virtual machine 140 applies enabled instructions 525 of object "West Coast" to the connection request of data packet 505, and updates object variables 530 of object "West Object."

In some embodiments, if data packet 505 includes a session disconnect indication, network application 130 invokes object virtual machine 140 to process the session disconnect indication of data packet 505.

If user defined object 410 or user defined object 515 includes a layer 7 security policy or service policy configured attribute, network application 130 invokes object virtual machine 140 to apply the appropriate policy.

If network application 130 modifies data packet 505, such as applying a network address translation (NAT), modifying a cookie, replacing some content in data packet 505 payload, inserting data into data packet 505, or other modifications known in the art, network application 130 may invoke object virtual machine 140 to process the modified data packet.

After the processing of data packet 505 by network application 130 and object virtual machine 140, servicing node 125 sends a resulting data packet to client 110 or server 115.

Figure 6:
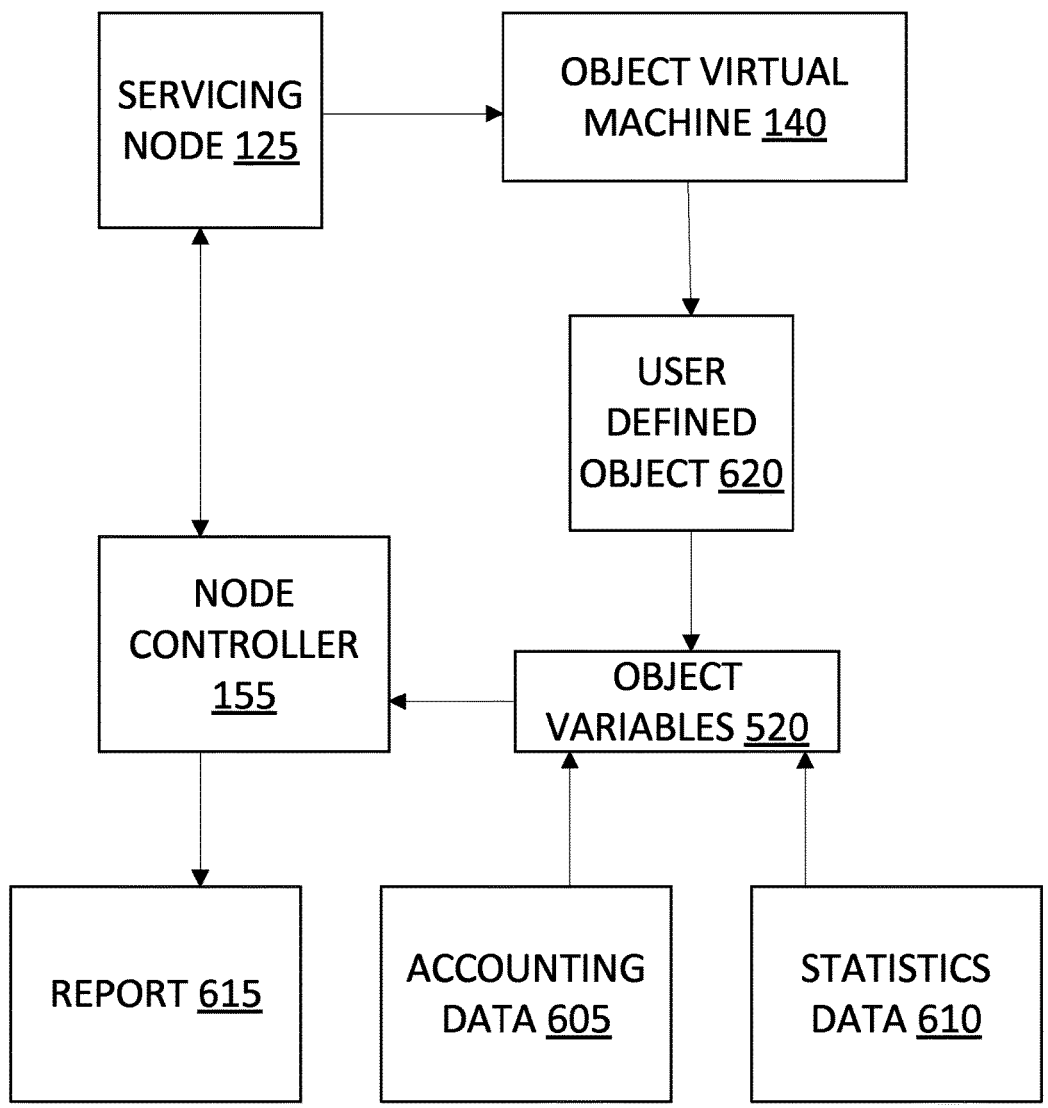
FIG. 6 illustrates an exemplary embodiment of generating accounting data.

In FIG. 6, object virtual machine 140 provides object variables 520 of user defined object 410 to a node controller 155. Object variables 520 may include accounting data 605 and/or statistics data 610. Accounting data 605 may include number of completed connections, number of security alerts based on security policy attributes of user defined object 410, amount of traffic over a period of time, one or more client device identities, one or more user identities of client device, or other useful accounting data. Statistics data 610 may include number of active connections, traffic statistics such as byte count, packet counts, or other statistics data. In some embodiments, node controller 155 receives accounting data 605 and statistics data 610 of user defined object 620. Node controller 155 generates a report 615 based on the received data. Report 615 may include billing report, security report, service level agreement report, network security report, network monitoring report, network capacity or resource utilization report, user report associated to user defined object 620, or report about a service provider, a regional service provider, a business entity associated to user defined object 620, or a client. In various embodiments, node controller 155 generates report 615 based on additional data of other user defined objects obtained from servicing node 125 or other servicing nodes.

In some embodiments, node controller 155 requests servicing node 125 to provide the data associated to user defined object 620 and/or other user defined objects created by object virtual machine 140. Node controller 155 may request from time to time, periodically, or based on a schedule, or node controller 155 may send a request per administrator command.

Alternatively, in various embodiments, servicing node 125 sends the data automatically to node controller 155 from time to time, periodically, or based on a schedule. Servicing node 125 may send the data or portion of the data based on an event, an security alert, or an administrator command, or servicing node 125 may send the data when user defined object 410 is removed from object virtual machine 140.

Figure 7:
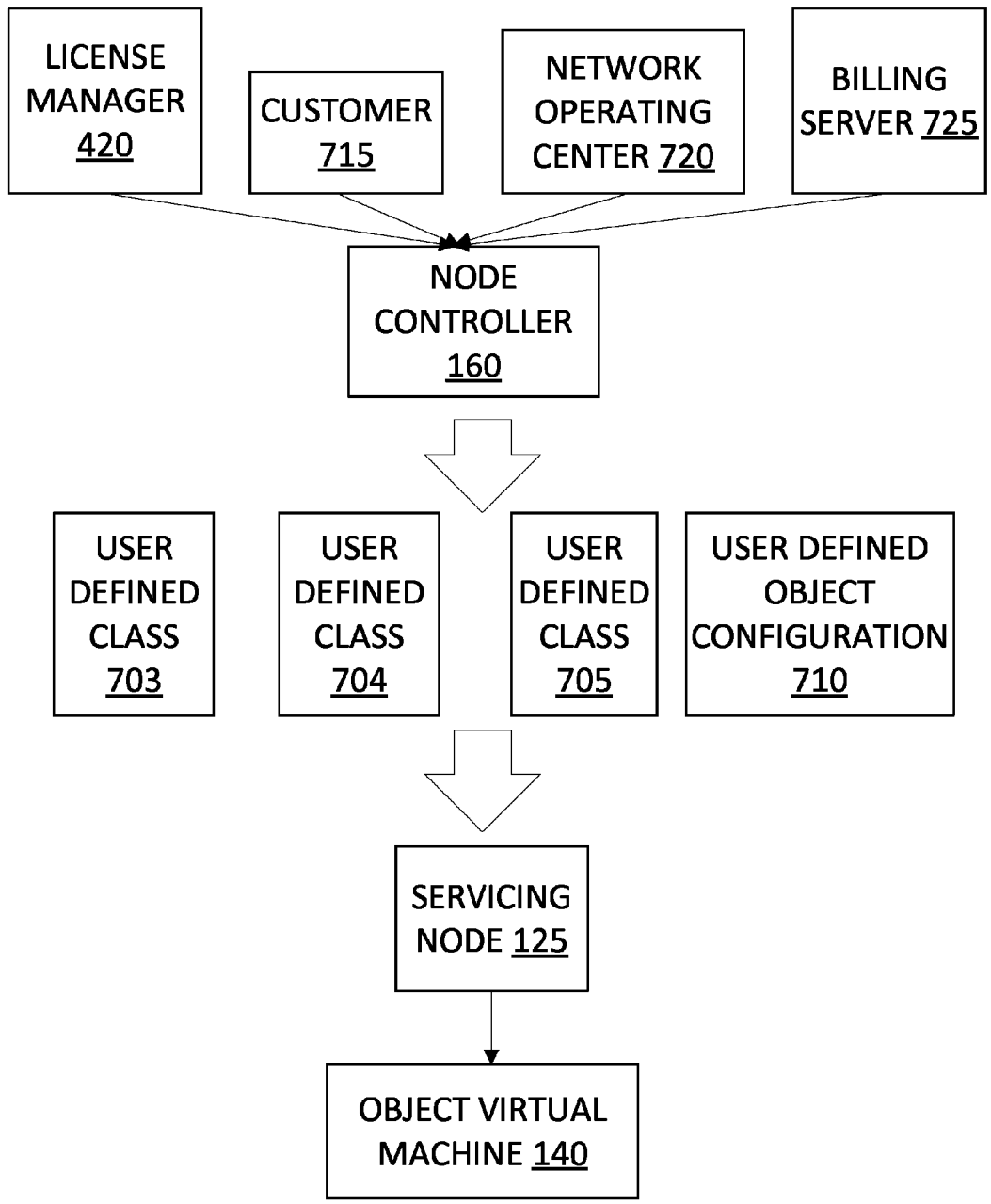
FIG. 7 illustrates an exemplary embodiment of deploying network services using user defined objects
Figure 8:
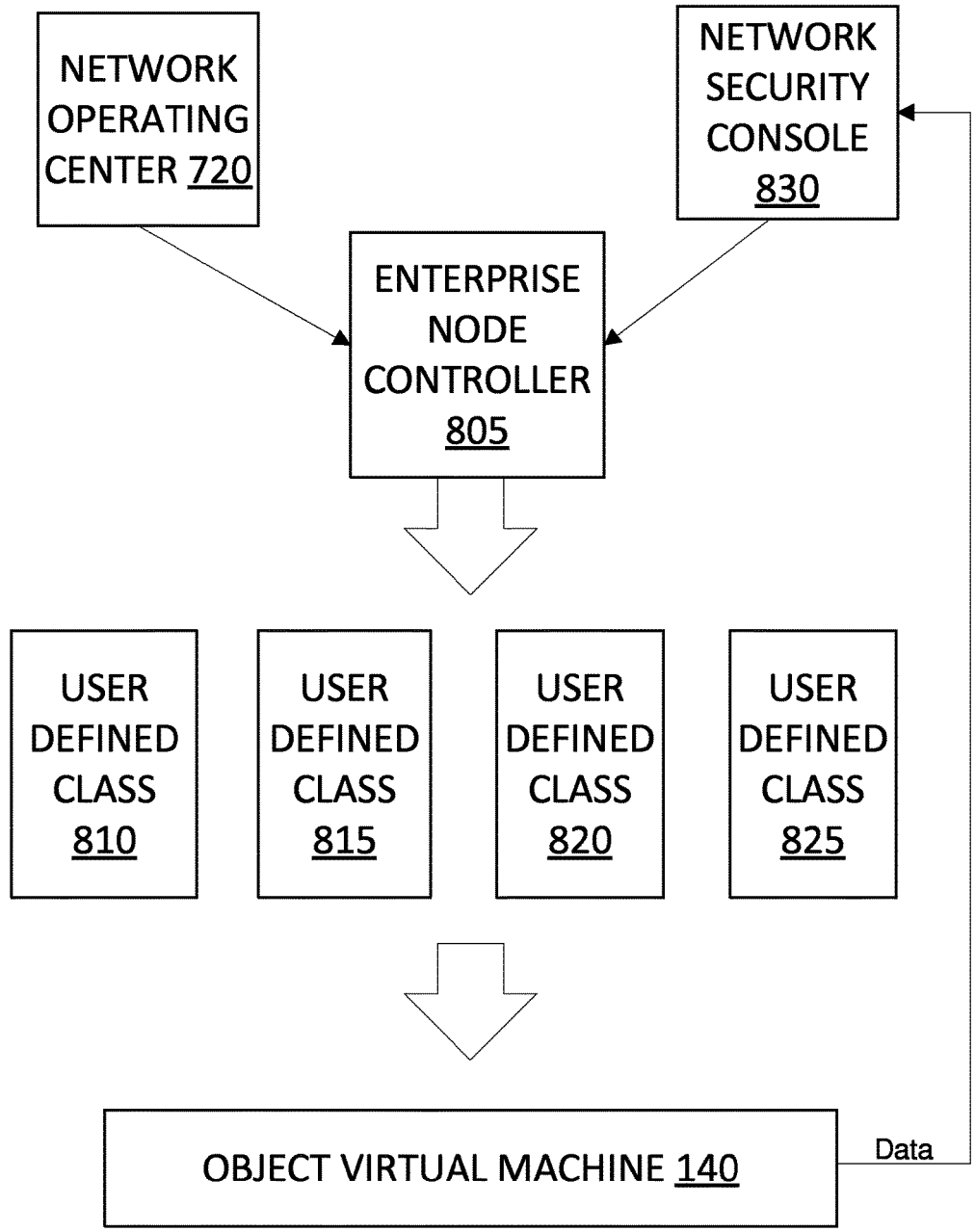
FIG. 8 illustrates another exemplary embodiment of deploying network services using user defined objects.

FIG. 7 and FIG. 8 illustrate exemplary embodiments of using servicing nodes with user defined classes and objects. In the exemplary embodiment of FIG. 7, node controller 160 offers cloud services, and sends user defined classes 703, 704, and 705 to servicing node 125. User defined class 704 is designed for cloud services offered to an area or a city, and it includes, but is not limited to, configurable attributes specifying security policies, service policies, IP address space, data collection policies, resource and capacity policies, and supported network applications. User defined class 705 is designed to offer aggregated cloud services over a region or a collection of area services. User defined class 705 may include aggregated IP address space, service policies, application policies, and capacities. User defined class 703 is designed for an aggregated cloud service covering a large geographic area.

In some embodiments, node controller 160 sends a user defined object configuration 710 to object virtual machine 140 to create a plurality of user defined objects based on user defined class 704. These created user defined objects for user defined class 704 are configured for various cities and area districts, each of which is configured with different attributes of security policies and other attributes. In other embodiments, the user defined object configuration 710 configures a plurality of objects based on user defined class 705. These created objects based on user defined class 705 are configured for regions, each of which covers a plurality of cities and area districts corresponding to the objects based on user defined class 704.

In various embodiments, user defined object configuration 710 includes a configuration for a user defined object based on user defined class 703. The created object is configured for a customer 715 of node controller 160. The customer can be a business, a small cloud service provider, a company, an organization, or a private cloud. The user defined classes 703, 704, and 705 may be associated to a license related to the customer 715. The license is verified by license manager 420.

In some embodiments, node controller 160 is associated to a network operating center 720 which obtains statistics data associated to the created user defined objects. Network operating center 720 monitors and manages operation of a data network containing servicing node 125. In other embodiments, node controller 160, which can be a cloud service provider, is associated to billing server 725 which obtains accounting data associated to the created user defined objects. Billing server 725 may generate a billing statement based on the obtained accounting data for customer 715.

FIG. 8 illustrates an exemplary embodiment of user defined classes in an enterprise. Enterprise node controller 805 represents a node controller for an IT department of an enterprise. Enterprise node controller 805 provides user defined class 810, designed to offer company-wide services; user defined class 815, designed to offer departmental services; user defined class 820, designed to offer individual or group level services; and user defined class 825, designed specifically for sales department. Enterprise node controller 805 monitors the IT services using network operating center 720 and specially monitors security breaches and alerts using network security console 830, which obtains security related statistics data from object virtual machine 140.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A system comprising:
   a servicing node including a network device, the servicing node comprising:
      at least one user defined object; and
      an object virtual machine; the servicing node being configured to:
      receive a data packet of a network session between a client device and a server;
      receive a user defined class and a user defined object configuration, the user defined class including user-defined instruction scripts provided by a user of the network device defined instruction scripts, the user defined object configuration including at least one or more configurations defined by the user of the network device for creating at least one user defined object;
      instruct the object virtual machine to generate the at least one user defined object based on the user defined class and the user defined object configuration, the at least one user defined object including one or more parameters to enable the user-defined instruction scripts to be executed by the object virtual machine, the at least one user defined object being stored at the servicing node to configure the servicing node to execute the user-defined instruction scripts; and
      apply, using the object virtual machine, the at least one user defined object to the data packet of the network session; and
   a hardware node controller configured to provide the user defined class and the user defined object configuration to the servicing node.

2. The system of claim 1, wherein the servicing node further comprises a network application.

3. The system of claim 2, wherein the servicing node applies the user defined object in conjunction with the network application to process the network session between the client device and the server.

4. The system of claim 1, wherein the user defined class includes a template for one or more instruction to create the user defined object.

5. The system of claim 1, wherein the servicing node applies the user defined object after receiving the user defined object configuration and user defined class, prior to the processing the network session between the client device and the server.

6. The system of claim 1, wherein the servicing node applies the user defined object after receiving the user defined object configuration and the user defined class, while the network session is in progress.

7. The system of claim 1, wherein each of the at least one user defined objects is configured with a different IP address.

8. The system of claim 1, wherein the user defined class requires a license to create the at least one user defined object.

9. The system of claim 1, wherein the object virtual machine determines if the at least one user defined object is applicable to the data packet of the network session.

10. The system of claim 9, wherein the object virtual machine applies a security policy to the data packet of the network session.

11. The system of claim 9, wherein the object virtual machine matches the data packet of the network application with a list of permissible network applications.

12. The system of claim 1, wherein the object virtual machine provides object variables of the at least one user defined object to the at least one node controller.

13. The system of claim 12, wherein the object variables comprise accounting data and statistics data.

14. A method to configure a network device with user-defined instruction scripts, the method comprising:
    receiving, by the network device comprising a servicing node, a data packet of a network session between a client device and a server;
    receiving a user defined class and a user defined object configuration at the servicing node, the servicing node comprising an object virtual machine, the user defined class including the user-defined instruction scripts provided by a user of the network device, the user defined object configuration including at least one or more configurations defined by the user of the network device for creating at least one user defined object;
    instructing, by the servicing node, the object virtual machine to generate the at least one user defined object based on the user defined class and the user defined object configuration, the at least one user defined object including one or more parameters to enable the user-defined instruction scripts to be executed by the object virtual machine, the at least one user defined object being stored at the servicing node to configure the servicing node to execute the user-defined instruction scripts; and
    applying, by the servicing node using the object virtual machine, the at least one user defined object to the data packet of the network session.

15. The method of claim 14, wherein the user defined class requires a license to create the at least one user defined object.

16. The method of claim 14, wherein the object virtual machine determines if the at least one user defined object is applicable to the data packet of the network session.

17. The method of claim 14, wherein the object virtual machine applies a security policy to the data packet of the network session.

18. The method of claim 14, wherein the object virtual machine provides object variables of the at least one user defined object to the at least one node controller.

19. The method of claim 18, wherein the object variables comprise accounting data and statistics data.

20. A non-transitory computer-readable storage medium comprising instructions, which when executed by one or more processors of a network controller, perform a method for configuring a network device with user-defined instruction scripts, the method comprising:
    receiving, by the network device comprising a servicing node, a data packet of a network session between a client device and a server;
    receiving a user defined class and a user defined object configuration at the servicing node, the servicing node comprising an object virtual machine, the user defined class including the user-defined instruction scripts provided by a user of the network device, the user defined object configuration including at least one or more configurations defined by the user of the network device for creating at least one user defined object;
    instructing, by the servicing node, the object virtual machine to generate the at least one user defined object based on the user defined class and the user defined object configuration, the at least one user defined object including one or more parameters to enable the user-defined instruction scripts to be executed by the object virtual machine, the at least one user defined object being stored at the servicing node to configure the servicing node to execute the user-defined instruction scripts; and
    applying, by the servicing node using the object virtual machine, the at least one user defined object to the data packet of the network session.

* * * * *